July 5, 1938.  H. L. CHISHOLM, JR  2,122,407
HYDRAULIC SHOCK ABSORBER
Filed March 15, 1937
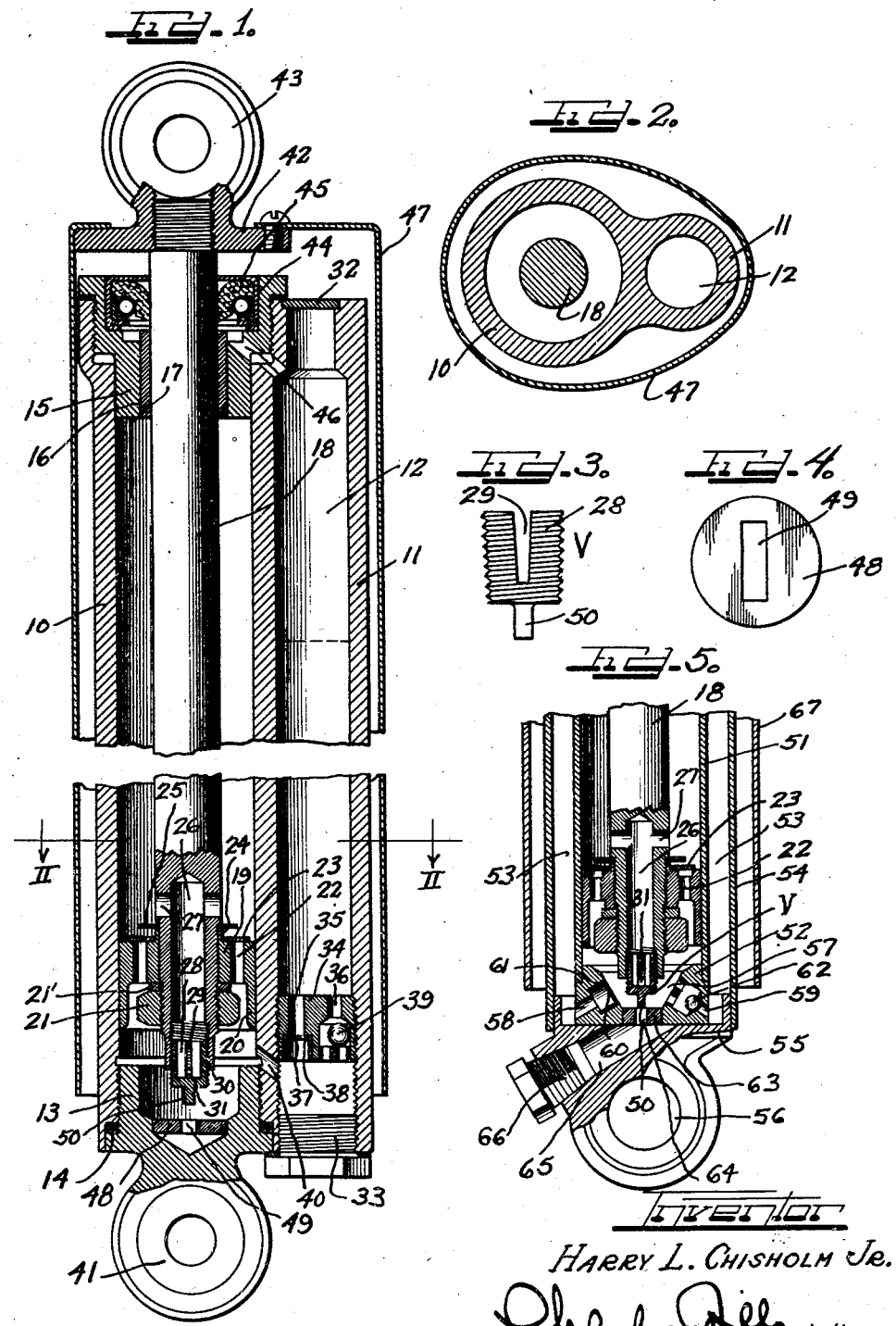
Inventor
HARRY L. CHISHOLM JR.

Patented July 5, 1938

2,122,407

UNITED STATES PATENT OFFICE 2,122,407

HYDRAULIC SHOCK ABSORBER

Harry L. Chisholm, Jr., Buffalo, N. Y., assignor to Houde Engineering Corporation, Buffalo, N. Y., a corporation of New York Application March 15, 1937, Serial No. 130,851

5 Claims. (Cl. 188—88)

This invention relates to hydraulic shock absorbers, and more particularly to those of the direct acting type adapted for use on automotive vehicles for modifying the action of the vehicle springs.

An important object of the invention is to provide an improved valving arrangement for controlling the flow of the displaced fluid for the desired shock absorbing action of the shock absorber. A further object is to provide adjustable valve means entirely concealed within the shock absorber structure after assembly thereof, and means also entirely within the shock absorber structure cooperable with the valve means for adjustment thereof upon relative rotational movement of the cylinder and piston elements after movement of such elements to a predetermined relative position.

The various features of my invention are incorporated in the structure shown in the drawing, in which drawing:

Figure 1 is a vertical diametrical section of the shock absorber;

Figure 2 is a section on plane II—II of Figure 1;

Figure 3 is an enlarged side elevation of the valve members;

Figure 4 is a plan view of the valve adjusting members; and

Figure 5 is a view similar to Figure 1 showing a modified arrangement.

The structure shown comprises a cylinder 10 having the boss 11 extending longitudinally at one side thereof to provide a fluid reservoir 12. The cylinder and the boss may be part of an integral casting. At its lower end, the cylinder is closed by a plug 13 having detachable threaded engagement with the cylinder end, a gasket 14 being preferably interposed to seal against leakage. At its upper end the cylinder is closed by a header or plug 15 having detachable threaded connection with the cylinder, the plug having a bore 16 for reception of a bearing bushing 17 for the piston rod 18, which at its inner end carries the piston structure.

The piston structure comprises the piston head 19 having the guide skirt 20. The piston head receives the inner end of the piston rod, which is threaded for reception of a nut 21 for clamping the head to the rod, a gasket 21' being preferably interposed.

Extending through the piston head are ports 22 for flow of hydraulic fluid from one side of the piston to the other, the flow through these ports being controlled by a valve 23 in the form of an annular plate or disk above the piston head. The valve is vertically reciprocable, and is guided by the neck 24 at the upper end of the piston head, its upward movement being limited by its engagement with an abutment plate 25 clamped between the neck 24 and the piston rod. During instroke of the piston, the valve 23 will be raised from its seat by the fluid pressure so that the fluid may flow freely through the ports 22. Upon upward movement of the piston, the pressure applies the valve over the ports to prevent fluid flow therethrough.

At its inner end, the piston rod has the bore 26, which is connected with the cylinder above the piston by radial ports 27. The connection of the bore with the cylinder below the piston is controlled by a valve V. The valve shown is in the form of a cylindrical cup 28 threaded on its outside for engagement with the internal threading at the lower end of the bore 26. The valve has longitudinally extending slits 29 which cooperate with the lower edge 30 of the piston rod to define restricted orifices 31 for controlling the fluid flow from one side of the piston to the other. The size of the orifices may be adjusted by rotational movement of the valve, which, on account of the threading, will result in axial movement of the valve for increasing or decreasing the size of the orifices. As shown in Figure 3, the valve, after being slitted, is expanded slightly radially in order that, when inserted into the end of the piston rod bore 26, it will have clamping engagement for frictionally holding it securely in adjusted position.

At its upper end the bore 12, which forms a reservoir, may be closed as by a sealing plate 32. At its lower end, the bore is closed by a removable plug 33 through which end the hydraulic fluid may be poured into the reservoir and into the cylinder. A distance above the lower end of the reservoir bore is a partition 34, which may be in the form of a plug threaded into the lower threaded end of the bore. This partition has the two passageways 35 and 36, the flow through the passageway 35 being controlled by a restricted orifice 37 in the base of a thimble 38 inserted in the lower end of the passageway. The flow through the passageway 36 is controlled by a check valve which may be in the form of a ball 39, the arrangement being such that the ball will prevent upward flow through the passageway, but will permit free downward flow therethrough. Below the partition 34 the reservoir is connected with the lower end of the cylinder by a passageway 40.

The closure plug 14 for the cylinder terminates in an eye 41, by which the lower end of the cylinder may be connected with a support, as for example the axle of an automotive vehicle with the springs of which the shock absorber is to be associated. Secured to the outer end of the piston rod 18, as by threading, is a fitting 42 having the eye 43 by means of which the piston rod may be connected with a support, as for example the chassis of the vehicle. When the shock absorber is applied to the vehicle, the cylinder and piston elements will have only relative longitudinal movement during operation of the vehicle, and will be held against relative rotational movement.

During compression movement of the vehicle springs, the piston structure will move inwardly, part of the fluid displaced from the inner end of the cylinder flowing to the upper end of the cylinder through the ports 22, the fluid pressure having lifted the valve 23 to expose the ports. Owing to the volumetric differential between the working chambers of the cylinder on account of the volume of the piston rod, the outer chamber cannot accommodate all of the fluid displaced from the inner chamber, and the surplus fluid will therefore flow through the passageway 40 into the lower end of the reservoir bore 12 and into the reservoir space through the orifice 37 in passageway 35, the passageway 36 being then closed by the ball 39. The orifice 37 will meter the flow of the surplus fluid and will produce the required hydraulic flow for shock absorbing resistance during the compression movement of the vehicle springs.

During rebound movement of the vehicle springs and outward movement of the piston in the cylinder, the valve 23 will be shifted to close the ports 22, and then the only outlet from the outer end of the cylinder to the inner end thereof will be by way of the piston rod bore 26 and the restricted orifices 31, which orifices will meter the flow for production of the desired shock absorber resistance to spring rebound. Due to the volumetric differential between the cylinder chambers, outward movement of the piston will tend to create vacuum or suction in the inner end of the cylinder, but this vacuum is broken by the free flow of fluid from the reservoir through the passageway 36 and the passageway 40, into the inner end of the cylinder.

At its outer end, the closure plug 15 for the outer end of the cylinder has the recess 44 for suitable packing material 45 surrounding the piston rod to prevent escape to the exterior of the shock absorber of any fluid which may have leaked past the bushing 17. Any such leakage fluid will be returned to the upper end of the reservoir through the passage 46 extending from the bottom of the recess 44. A sheet metal cylindrical shell or shield 47 may be suspended from the fitting 42 to surround the cylinder and reservoir structure.

Before the shock absorber is assembled, the valve V is adjusted as closely as possible for the desired service. However, it may be desirable to effect a final adjustment after the shock absorber has been assembled and before it is applied to the vehicle. I therefore provide an arrangement whereby such adjustment may be accomplished by relative rotational movement of the cylinder and piston. In the bottom of the bore of the closure plug 13, a disk or plate 48 is rigidly seated, this plate having an elongated diametrically extending slot 49. The valve V has a lug or tongue 50 extending from its base and extending diametrically and elongated to engage in the slot 49 of the plate 48. To make the adjustment, the piston rod is pushed inwardly to shift the piston to the innermost end of the cylinder. After such relative longitudinal setting of the cylinder and piston, a relative turning thereof in one direction or the other will rotate the threaded valve V so that by resulting axial movement the size of the orifices 31 may be correspondingly increased or decreased for the desired hydraulic action during rebound movement of the vehicle springs. After the shock absorber is secured in service position on the vehicle and the cylinder and piston held against relative rotational movement, the adjustment setting of the valve will be maintained during subsequent service operation of the shock absorber.

In the modified arrangement shown in Figure 5, the cylinder comprises a length of tubing 51 closed at its lower end by a header plug 52. The reservoir space 53 is provided between the tube 51 and an outer tube 54 coaxial with the tube 51 and secured at its lower end to the fitting 55, which terminates in the eye 56, the cylinder header 52 seating against the fitting 55. The piston structure and valve means for controlling the flow of hydraulic fluid from one side to the other thereof is the same as that shown in Figure 1, and the same reference characters are therefore applied thereto.

The cylinder header 52 has the frusto-conical recess or cavity 57 from which passageways 58 and 59 lead to the lower end of the reservoir space 53. The flow through the passageway 58 is controlled by an orifice 60 in the base of a thimble 61 seated in the inner end of the passageway 58. The flow through the passageway 59 is controlled by a check valve such as a ball 62 which closes the passageway against flow into the reservoir but permits free reverse flow. During inward movement of the piston in the cylinder, the displaced fluid flow which cannot be accommodated by the ports 22 in the piston will be through the orifice 60 and into the reservoir. During outward movement of the piston, the ports will be closed by the valve 23, and the flow from the outer to the inner end of the cylinder will be controlled by the orifices 31 provided by the valve V, the fluid then flowing freely from the reservoir past the check valve 62 and into the inner end of the cylinder.

A disk or plate 63 forms the bottom of the recess 57 and is rigidly secured therein, and has the slot 64 for receiving the tongue 50 on the valve V when the piston is moved to the innermost position in the cylinder, so that when the cylinder and piston are then relatively rotated the valve V may be adjusted.

For supplying the shock absorber with hydraulic fluid, the fitting 55 may have the diagonally extending filling passageway 65 which communicates with the slot 64 in the plate 63, the outer end of the filler passage being closable by a threaded plug 66. The charged-in fluid will flow through the slot 64 into the cylinder and through the passages 58 and 59 into the reservoir. A shield tube 67 is preferably provided around the shock absorber structure, and this shield tube may be suspended from a fitting at the upper end of the piston rod in a manner as shown in Figure 1, or in any other suitable manner.

I have thus produced a simple, compact, and efficient shock absorber structure of the direct acting type in which accurate adjustment and setting of the rebound flow controlling valve may be readily effected by relative rotation of the cylinder and piston after assembly thereof, so that, when the shock absorber is in service, the valve will maintain its proper setting and can be further adjusted only by disconnection of the shock absorber for relative rotation of its cylinder and piston elements.

I have shown practical and efficient embodiments of the various features of my invention, but I do not desire to be limited to the exact construction, arrangement, and operation shown and described, as changes and modifications may be made without departing from the scope of the invention.

I claim as my invention:

1. In a hydraulic shock absorber of the direct acting type, a cylinder structure, a piston structure comprising a piston and a piston rod extending therefrom through an end of the cylinder structure, said piston rod having a bore in its inner end, a passageway including said bore for the flow of fluid from one side of the piston to the other during relative longitudinal movement of said structures, a valve threading into the end of said bore and having a slit for cooperating with the end of the piston rod to define a restricted orifice for metering the flow through said passageway, and means within and carried by the cylinder structure for cooperation with said valve upon relative rotation of said structures for rotating said valve for increasing or decreasing the size of said orifice for subsequent normal operation of the shock absorber.

2. In a hydraulic shock absorber of the direct acting type, a cylinder structure, a piston structure comprising a piston and a piston rod extending therefrom through an end of the cylinder structure, said piston rod having a bore at its inner end, a passageway including said bore for the flow of fluid from one side of the piston to the other during relative longitudinal movement of said structures, a valve having threaded engagement in the end of said bore and having a port cooperable with the outer edge of said bore to define a restricted orifice for metering the flow through said passageway, and means within said cylinder structure effective upon relative rotational movement of said structures to rotate said valve for axial movement thereof to increase or decrease the overlap of said port by said edge for determining the control of the flow by said orifice during subsequent normal operation of the shock absorber.

3. In a hydraulic shock absorber of the direct acting type, a cylinder structure, a piston rod structure comprising a piston and a piston rod extending therefrom through an end of the cylinder structure, said piston rod having a bore extending therein from the inner end thereof, the piston rod wall surrounding the entrance end of said bore presenting a comparatively thin edge, a valve coaxial with the piston rod and having threaded engagement therewith in the entrance end of said bore, said valve having a port for cooperating with said edge to define a restricted orifice for metering the flow through said bore from one side of the piston to the other, and means effective when the piston is moved to its innermost position in said cylinder for connecting said valve and cylinder for rotational movement of the valve during relative rotational movement of said structures whereby said valve may be moved in axial direction for increasing or decreasing the overlap of said port by said edge and corresponding change in the size of the orifice for control of the fluid flow during subsequent normal operation of the shock absorber.

4. In a hydraulic shock absorber of the direct acting type, a cylinder structure, a piston structure comprising a piston and a piston rod extending therefrom through an end of the cylinder structure, said piston rod having a longitudinally extending passageway at its inner end for flow of hydraulic fluid from one side of the piston to the other during relative longitudinal movement of said structures, a valve having threaded engagement in the inner end of said passageway and having a port for cooperating with the end of the piston rod to define a restricted orifice for metering the fluid flow through said passageway, abutments on said valve and the inner end of said cylinder, respectively, said abutments remaining out of engagement during normal operation of the shock absorber but being brought into engagement when the piston is moved to its innermost position in the cylinder and being then effective upon relative rotational movement of said structures to cause rotary movement of said valve and thereby axial movement thereof for increasing or decreasing the exposure of the valve port to said passageway for control of the fluid flow during subsequent normal operation of the shock absorber.

5. In a hydraulic shock absorber of the direct acting type, a cylinder structure, a piston structure comprising a piston and a piston rod extending therefrom through an end of the cylinder structure, said piston rod having a passageway therethrough for flow of fluid from one side of the piston to the other during normal relative longitudinal movement of said structures, a valve having threaded engagement in said passageway and having a port for more or less exposure to said passageway by the axial movement of said valve, a tongue on the end of said valve, means providing a slot at the inner end of the cylinder for receiving said tongue when the piston is moved to its innermost position, the connection of said tongue and slot being effective upon relative rotation of said structures to rotate said valve for axial shift thereof for increase or decrease of the exposure of the valve port to said passageway and the desired shock absorbing action during subsequent normal operation of the shock absorber.

HARRY L. CHISHOLM, Jr.